(12) United States Patent
Muraji et al.

(10) Patent No.: US 9,290,138 B2
(45) Date of Patent: Mar. 22, 2016

(54) VEHICLE FRONT SECTION STRUCTURE

(71) Applicant: TOYOTA JIDOSHA KABUSHIKI KAISHA, Toyota-shi (JP)

(72) Inventors: Masao Muraji, Miyoshi (JP); Shota Hashimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/426,861

(22) PCT Filed: Sep. 3, 2013

(86) PCT No.: PCT/JP2013/073697
§ 371 (c)(1),
(2) Date: Mar. 9, 2015

(87) PCT Pub. No.: WO2014/042041
PCT Pub. Date: Mar. 20, 2014

(65) Prior Publication Data
US 2015/0246651 A1   Sep. 3, 2015

(30) Foreign Application Priority Data

Sep. 14, 2012   (JP) .................................. 2012-203000

(51) Int. Cl.
*B60R 19/00* (2006.01)
*B60R 19/02* (2006.01)
*B62D 21/15* (2006.01)
(Continued)

(52) U.S. Cl.
CPC ................. *B60R 19/02* (2013.01); *B60R 19/03* (2013.01); *B60R 19/24* (2013.01); *B62D 21/152* (2013.01); *B62D 25/082* (2013.01); *B60R 19/34* (2013.01); *B60R 2019/026* (2013.01)

(58) Field of Classification Search
CPC .... B62D 21/152; B62D 25/082; B60R 19/02; B60R 19/03; B60R 19/24
USPC .............................. 296/187.1, 187.09, 203.02
See application file for complete search history.

(56) References Cited

U.S. PATENT DOCUMENTS

| 8,596,711 B2 | 12/2013 | Yasui et al. |
| 2001/0024053 A1 | 9/2001 | Takase et al. |

(Continued)

FOREIGN PATENT DOCUMENTS

| JP | 07-187003 A | 7/1995 |
| JP | 2000-053022 A | 2/2000 |

(Continued)

OTHER PUBLICATIONS

International Search Report issued Oct. 8, 2013 in PCT/JP2013/073697 Filed Sep. 3, 2013.

*Primary Examiner* — Joseph D Pape
(74) *Attorney, Agent, or Firm* — Oblon, McClelland, Maier & Neustadt, L.L.P.

(57) ABSTRACT

A vehicle front section structure includes a front side member disposed running along a vehicle front-rear direction at a vehicle width direction outside of a vehicle front section, and a projection member provided at an outside wall of the front side member so as to project out further to the vehicle width direction outside than the outside wall, a rear end portion of the projection member being positioned further to a vehicle rear side than a vehicle front side end portion of a power unit disposed at a vehicle width direction inside of the front side member in plan view.

7 Claims, 9 Drawing Sheets

(51) Int. Cl.
*B62D 25/08* (2006.01)
*B60R 19/03* (2006.01)
*B60R 19/24* (2006.01)
*B60R 19/34* (2006.01)

(56) References Cited

U.S. PATENT DOCUMENTS

2004/0195862 A1   10/2004   Saeki
2004/0200659 A1   10/2004   Miyasaka
2013/0328334 A1*  12/2013   Hoiss et al. .................. 293/154
2014/0091585 A1*  4/2014    Ramoutar et al. ............ 293/133
2014/0091595 A1*  4/2014    Ramoutar et al. ....... 296/187.09

FOREIGN PATENT DOCUMENTS

| | | |
|---|---|---|
| JP | 2001-270465 A | 10/2001 |
| JP | 2003-226266 A | 8/2003 |
| JP | 2004-066932 A | 3/2004 |
| JP | 2006-103591 A | 4/2006 |
| JP | 2007-126093 A | 5/2007 |
| JP | 2011-126399 A | 6/2011 |
| JP | 2012-214211 A | 11/2012 |

* cited by examiner

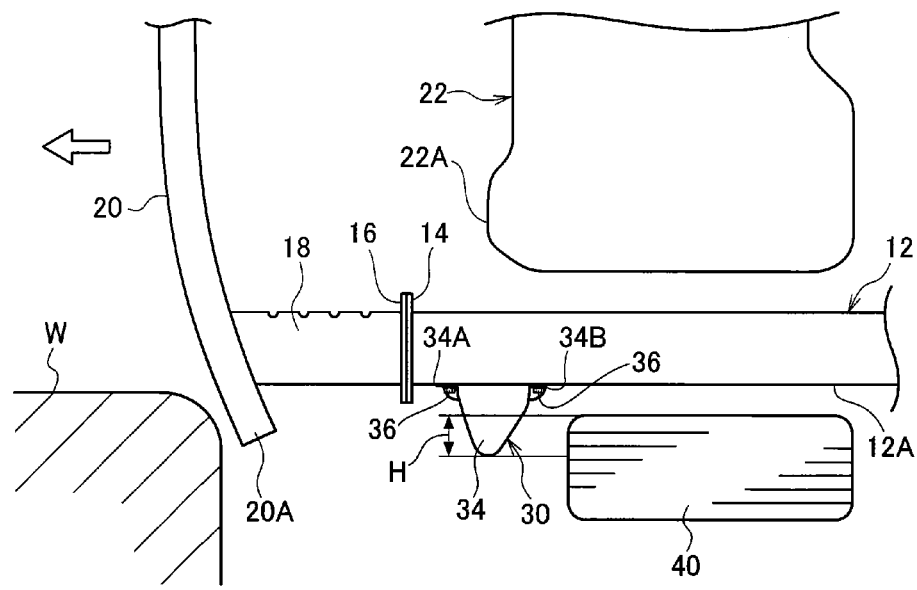
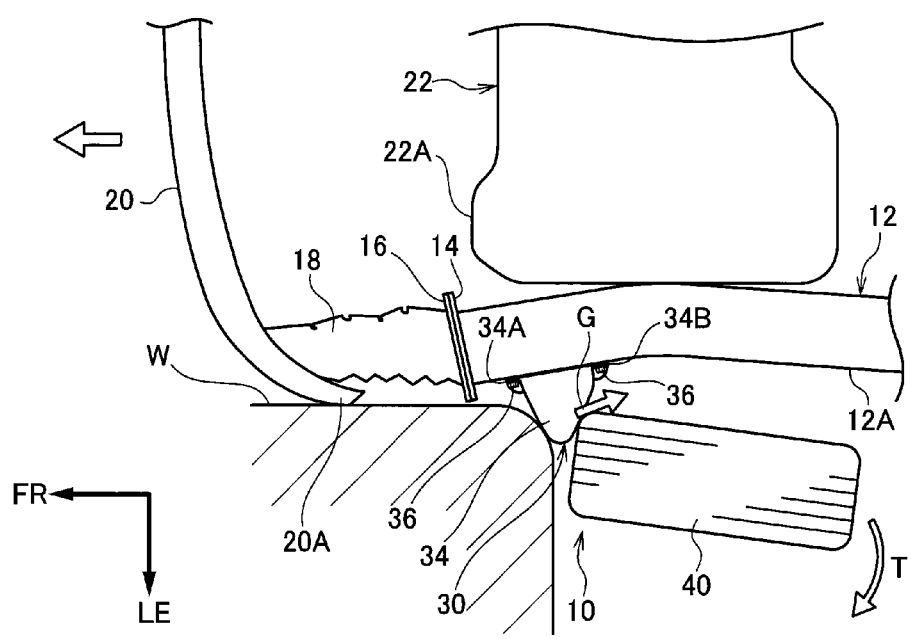

VEHICLE FRONT SECTION STRUCTURE

TECHNICAL FIELD

The present invention relates to a vehicle front section structure.

BACKGROUND ART

A vehicle front section structure has been proposed in which a reinforcement member extending toward the vehicle front outside is provided at a side portion of a front side member, and further to the vehicle rear side than a rear end of a crash box (see for example Japanese Patent Application Laid-Open (JP-A) No. H07-187003).

SUMMARY OF INVENTION

Technical Problem

In order to suppress deformation of the vehicle in the event of a frontal collision at the vehicle width direction outside of a front side member (a small overlap collision), efficient generation of lateral force with respect to the vehicle (force toward the opposite side to the collision side in the vehicle width direction) is desirable.

Accordingly, an object of the present invention is to obtain a vehicle front section structure capable of efficiently generating lateral force with respect to the vehicle in the event of a small overlap collision.

Solution to Problem

In order to achieve the above object, a vehicle front section structure of a first aspect of the present invention includes a front side member disposed running along a vehicle front-rear direction at a vehicle width direction outside of a vehicle front section, and a projection member provided at outside wall of the front side member so as to project out further to the vehicle width direction outside than the outside wall, a rear end portion of the projection member being positioned further to a vehicle rear side than a vehicle front side end portion of a power unit disposed at a vehicle width direction inside of the front side member in plan view.

According to the first aspect of the present invention, the projection member is provided at the outside wall of the front side member so as to project out further to the vehicle width direction outside than the outside wall. In plan view the rear end portion of the projection member is positioned further to the vehicle rear side than the vehicle front side end portion of the power unit disposed at the vehicle width direction inside of the front side member. In the event of a collision with a barrier at the vehicle width direction outside of the front side member (a small overlap collision), the projection member collides with the barrier accompanying forward progress of the vehicle, and a portion of the collision load is transmitted through the front side member to the power unit. Lateral force with respect to the vehicle is thus efficiently generated.

A vehicle front section structure of a second aspect of the present invention is the vehicle front section structure of the first aspect, wherein a front end portion of the projection member is positioned further to the vehicle rear side than a crash box provided at a front end portion of the front side member.

According to the second aspect of the present invention, the front end portion of the projection member is positioned further to the vehicle rear side than the crash box provided at the front end portion of the front side member. The projection member therefore does not impede energy absorption by the crash box in the event of a small overlap collision or an offset collision. Note that the "further to the vehicle rear side than the crash box" includes cases in which the position of a rear end of the crash box is substantially the same as the position of the front end portion of the projection member in the vehicle front-rear direction.

A vehicle front section structure of a third aspect of the present invention is the vehicle front section structure of either the first aspect or the second aspect, wherein the projection member is configured including a resin member and a metal member covering the resin member.

According to the third aspect of the present invention, the projection member is configured including the resin member and the metal member covering the resin member. The localized crushing of the projection member is accordingly suppressed, suppressing a drop in the load transmission efficiency of the projection member compared to cases in which the projection member is configured by a resin member only.

A vehicle front section structure of a fourth aspect of the present invention is the vehicle front section structure of the third aspect, wherein a space is formed between the resin member and the front side member.

According to the fourth aspect of the present invention, a space is formed between the resin member and the front side member. The space suppresses axial compression deformation of the front side member from being obstructed in the event of a full overlap collision or an offset collision.

A vehicle front section structure of a fifth aspect of the present invention is the vehicle front section structure of any one of the first aspect to the fourth aspect, further including a load transmission member provided at a side portion of the power unit at the vehicle rear side, or provided at an inside wall of the front side member facing the side portion in a vehicle width direction.

According to the fifth aspect of the present invention, the load transmission member is provided at the side portion of the power unit at the vehicle rear side, or provided at the inside wall of the front side member facing the side portion in the vehicle width direction. Accordingly, in the event of a small overlap collision, the load transmission member efficiently transmits a portion of the collision load, transmitted from the projection member to the power unit, to the front side member on the opposite side.

A vehicle front section structure of a sixth aspect of the present invention is the vehicle front section structure of any one of the first aspect to the fifth aspect, wherein the projection member is formed in a substantially triangular shape with an apex on the vehicle width direction outside in plan view.

According to the sixth aspect of the present invention, the projection member is formed in a substantially triangular shape with an apex on the vehicle width direction outside in plan view. Namely, the projection member is formed with an oblique face at an angle with respect to the vehicle width direction in plan view. A vehicle width direction component force is thereby efficiently obtained by the oblique face when the projection member collides with the barrier.

Advantageous Effects of Invention

As described above, the first aspect of the present invention enables lateral force with respect to the vehicle to be efficiently generated in the event of a small overlap collision.

The second aspect of the present invention enables a portion of the input collision load to be absorbed by the crash box in the event of a full overlap collision or an offset collision.

The third aspect of the present invention enables localized crushing of the projection member to be suppressed, and enables a drop in load transmission efficiency by the projection member to be suppressed.

The fourth aspect of the present invention enables a reduction in energy absorption efficiency due to axial compression deformation of the front side member to be suppressed in a full overlap collision or an offset collision.

The fifth aspect of the present invention can facilitate transmission of lateral force generated in a small overlap collision to the collision-opposite side.

The sixth aspect of the present invention enables efficient generation of lateral force with respect to the vehicle.

BRIEF DESCRIPTION OF DRAWINGS

FIG. 9A is a plan view illustrating a vehicle front section structure according to the present exemplary embodiment, in which the projection height of a projection member has been increased so as to overlap with a front wheel in the vehicle width direction, in a state prior to a small overlap collision.

FIG. 9B is a plan view illustrating a vehicle front section structure according to the present exemplary embodiment, in which the projection height of a projection member has been increased so as to overlap with a front wheel in the vehicle width direction, in a state following a small overlap collision.

DESCRIPTION OF EMBODIMENTS

Detailed explanation follows regarding an exemplary embodiment of the present invention, with reference to the drawings. For ease of explanation, in each of the drawings the arrow UP indicates the vehicle upward direction, the arrow FR indicates the vehicle front, and the arrow LE indicates the vehicle left direction as appropriate. In the following explanation, unless specifically indicated, reference to up, down, front, rear, left, and right respectively refer to up and down in the vehicle up-down direction, front and rear in the vehicle front-rear direction, and left and right and the vehicle left-right direction (vehicle width direction).

Figure 6:
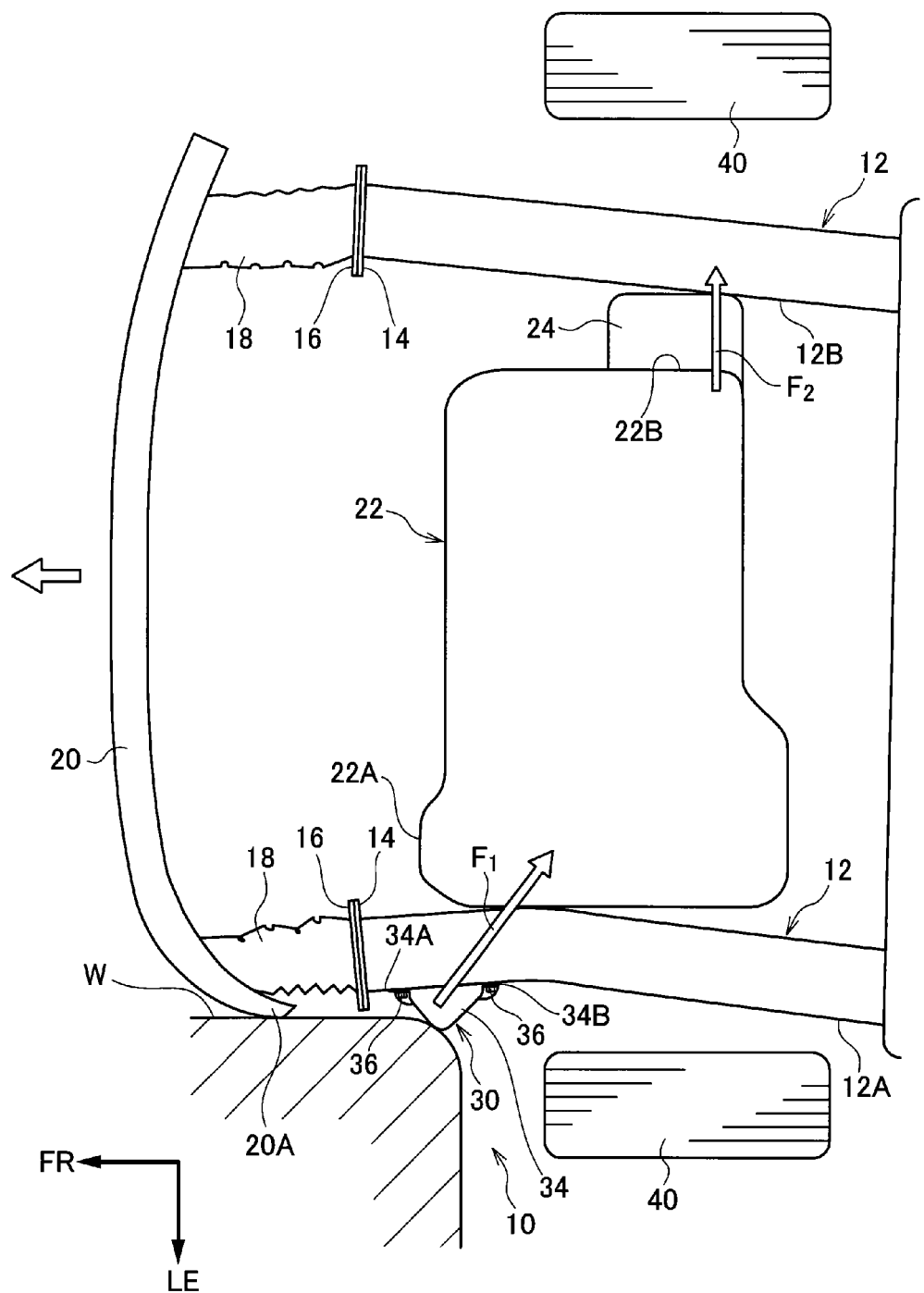
FIG. 6 is a plan view illustrating a vehicle front section structure according to the present exemplary embodiment, provided with a spacer at a right side portion of a power unit at the vehicle rear side, in a state following a small overlap collision.

Each of the drawings illustrates the left side of a vehicle. However, the right side of the vehicle is similar, with left-right symmetry, and so explanation regarding the right side of the vehicle is omitted where appropriate. FIG. 6, described later, illustrates a case in which a small overlap collision has occurred at the left side of the vehicle, and so a spacer 24 at a left side portion 22C of a power unit 22 is omitted from illustration, and only a spacer 24 at a right side portion 22B is illustrated. FIG. 6 also omits a projection member 30 provided at a right side front side member 12.

Figure 1:
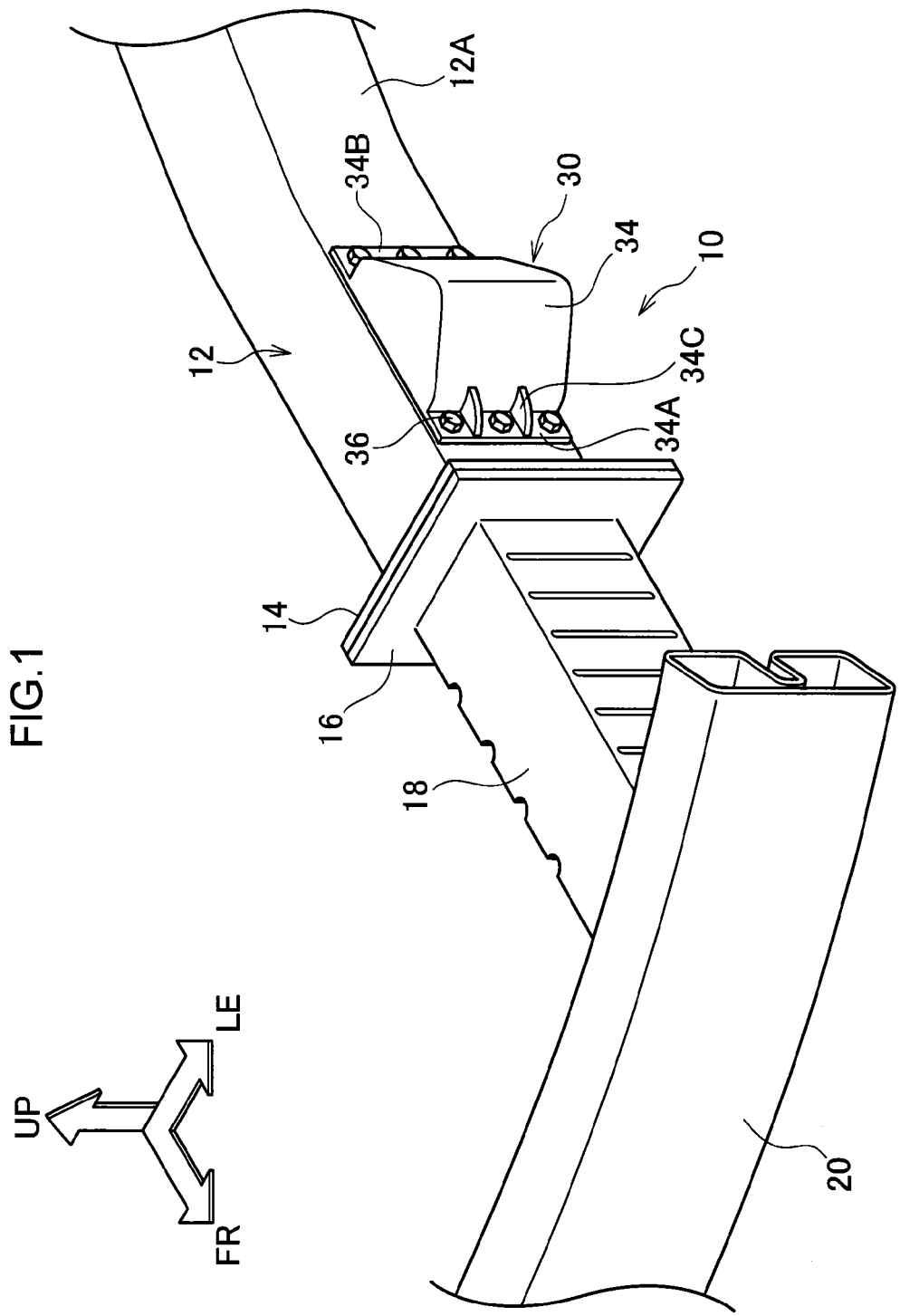
FIG. 1 is an enlarged perspective view illustrating relevant portions of a vehicle front section structure according to an exemplary embodiment.

As illustrated in FIG. 1, a pair of left and right front side members 12, each with a rectangular closed cross-section profile, are disposed extending in the vehicle front-rear direction at vehicle width direction outsides of a vehicle front section. Front end portions of each of the front side members 12 are respectively provided with a rectangular shaped coupling plate 14 to close off the respective front side members 12.

Each of the coupling plates 14 is overlapped with, and joined to, a rectangular shaped coupling plate 16. A crash box 18, configured with a rectangular shaped closed cross-section profile, extends towards the vehicle front side from each of the coupling plates 16. Namely, each of the crash boxes 18 is provided coaxially to the respective front side member 12 as viewed from above and from the side, through the coupling plates 14, 16.

Front bumper reinforcement 20, with a rectangular closed cross-section profile, extends spanning in the vehicle width direction between vehicle front side ends of the respective crash boxes 18. Namely, the vehicle front side ends of the respective crash boxes 18 are each connected to a rear face of the front bumper reinforcement 20.

Figure 2:
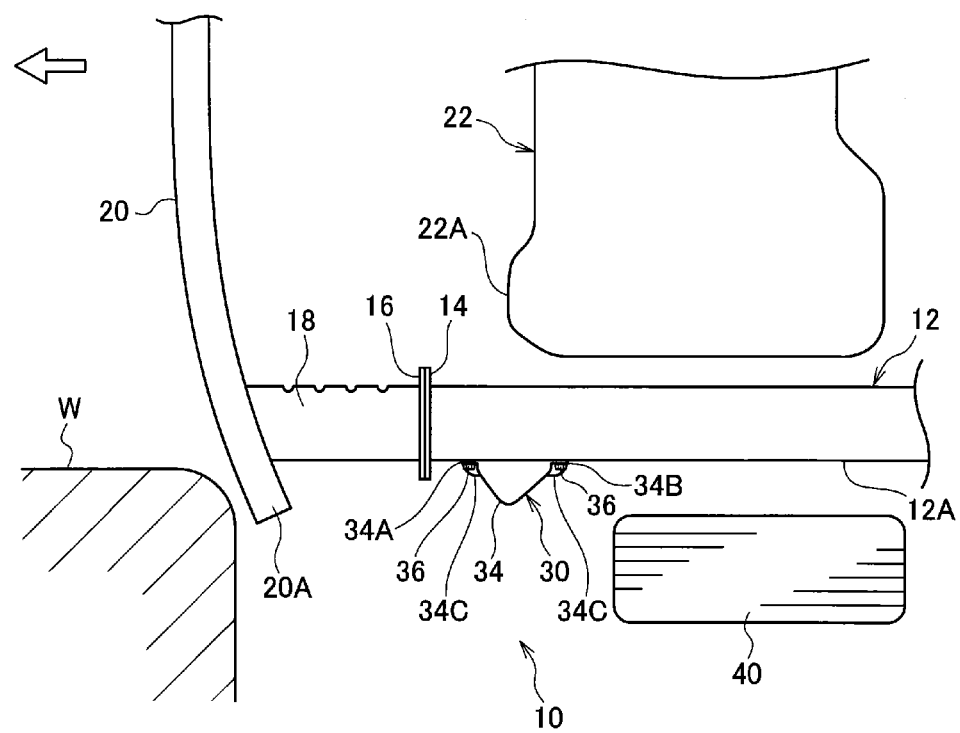
FIG. 2 is a plan view illustrating a vehicle front section structure according to the present exemplary embodiment, in a state prior to a small overlap collision.
Figure 3:
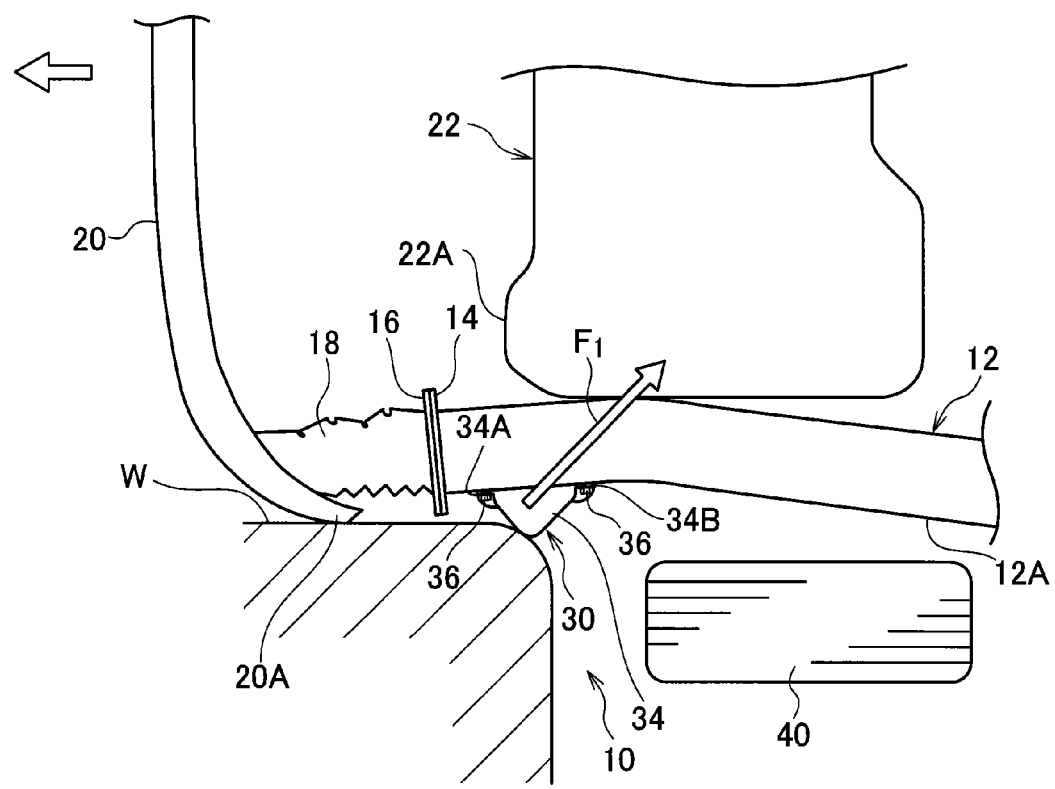
FIG. 3 is a plan view illustrating a vehicle front section structure according to the present exemplary embodiment, in a state following a small overlap collision.

As illustrated in FIG. 2 and FIG. 3, a power unit 22, including an engine and a transmission, for example, is installed between the left and right front side members 12. Substantially triangular shaped projection members 30, with an apex on the vehicle width direction outside in plan view, are fastened and fixed to outside walls 12A, these being vehicle width direction outside walls of the respective front side members 12, so as to project out further toward the vehicle width direction outside than the outside walls 12A.

Figure 4:
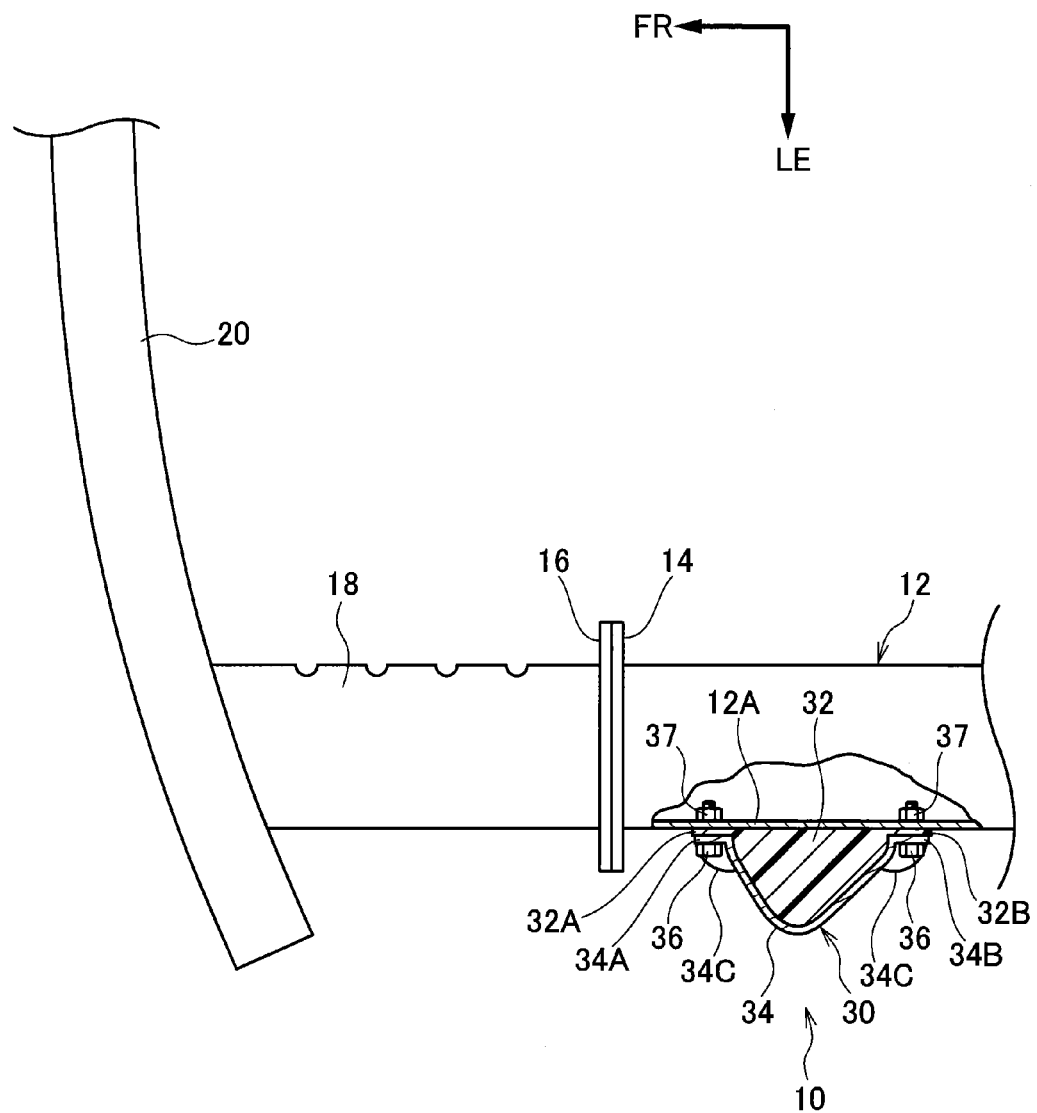
FIG. 4 is a plan view cross-section illustrating a configuration of a projection member not formed with a space.

As illustrated in FIG. 4, each projection member 30 is configured from a projection member body 32 serving as a resin member (soft member), and a cover body 34 (a steel plate or the like) serving as a metal member (hard member) covering the projection member body 32. Namely, the projection member 30 is formed in a substantially triangular shape in which the projection member body 32 and the cover body 34 have an apex on the vehicle width direction outside in plan view.

Figure 5:
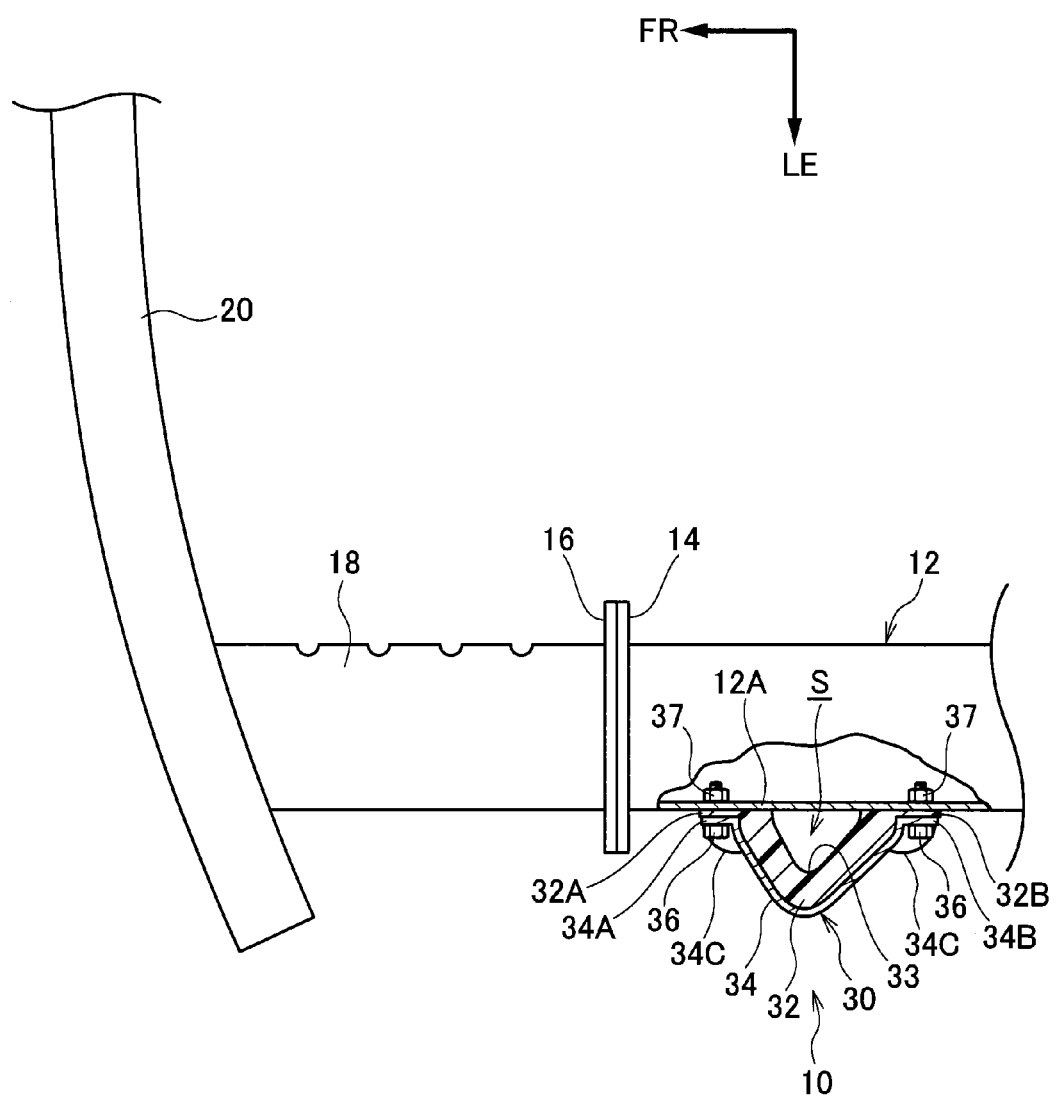
FIG. 5 is a plan view cross-section illustrating a configuration of a projection member formed with a space.

Note that as illustrated in FIG. 5, a substantially hemispherical shaped recess 33 may be formed at a substantially central portion of the projection member body 32, and a space S may be formed between the projection member body 32 and the outside wall 12A of the front side member 12.

Moreover, as illustrated in FIG. 4 and FIG. 5, a front end portion and a rear end portion of the projection member body 32 are integrally formed with respective flanges 32A, 32B. A front end portion and a rear end portion of the cover body 34 are also integrally formed with respective flanges 34A, 34B, overlapping with the respective flanges 32A, 32B from the vehicle width direction outside.

The respective flanges 34A, 32A and the respective flanges 34B, 32B are each formed with plural through holes (not illustrated in the drawings) for insertion of bolts 36 (for example three: see FIG. 1). The respective through holes formed in the flange 34A and the flange 32A are in communication with each other, and the respective through holes formed in the flange 34B and the flange 32B are in communication with each other.

The outside wall 12A of the front side member 12 is formed with plural through holes (not illustrated in the drawings) in communication with the respective through holes, and weld nuts 37 are provided coaxially to the plural through holes at an inner face of the outside wall 12A.

The projection member 30 is fastened and fixed to the outside wall 12A of the front side member 12 by inserting the bolts 36 into the respective through holes formed in the flanges 34A, 32A and the flanges 34B, 32B, and screwing the bolts 36 into the weld nuts 37. Note that flat plate shaped ribs 34C (see FIG. 1) are integrally formed to the flanges 34A, 34B between each of the through holes, thereby raising the rigidity (strength) of the cover body 34.

The projection member body 32 may be configured with a structure not including the flanges 32A, 32B. Namely, configuration may be made in which the projection member body 32 is housed inside the cover body 34, and only the flanges 34A, 34B of the cover body 34 are fastened and fixed to the outside wall 12A of the front side member 12.

However, it is preferable to form the projection member body 32 with the flanges 32A, 32B, and to fasten and fix the flanges 32A, 32B to the outside wall 12A of the front side member 12 together with the flanges 34A, 34B of the cover body 34. So doing suppresses or prevents rattling of the projection member body 32 against the cover body 34.

The front end portion of the projection member 30 (at least the flange 34A) is fastened and fixed to the outside wall 12A of the front side member 12 further to the vehicle rear side than the crash box 18. As illustrated in FIG. 2 and FIG. 3, in plan view the rear end portion of the projection member 30 (at least the flange 34B) is fastened and fixed to the outside wall 12A of the front side member 12 further to the vehicle rear side than a vehicle front side end portion 22A of the power unit 22, and further to the vehicle front side than a vehicle front-rear direction central portion of the power unit 22.

Note that the projection member 30 is not limited to a configuration fixed to the outside wall 12A of the front side member 12 by the bolts 36 and the weld nuts 37. For example, the respective flanges 34A, 34B may be joined to the respective flanges 32A, 32B using an adhesive, and the flanges 32A, 32B may then be fixed to the outside wall 12A using an adhesive. The projection member 30 may also be fixed to the outside wall 12A using an adhesive in combination with the bolts 36 and the weld nuts 37.

As illustrated in FIG. 6, a rectangular box shaped spacer 24, serving as a load transmission member, is attached to a right side portion 22B of the power unit 22 at the vehicle rear side (at a side portion on the vehicle rear side). The spacer 24 is formed from a resin or metal at a size leaving a gap in the vehicle width direction to an inside wall 12B that is a vehicle width direction inside wall of the front side member 12. The gap is set such that the spacer 24 can contact the inside wall 12B in the event of a small overlap collision.

A front end portion of the spacer 24 is disposed further to the vehicle rear side than the rear end portion (at least the flange 34B) of the projection member 30 in plan view. The spacer 24 is not limited to a configuration attached to the side portion 22B (side portion 22C) of the power unit 22 at the vehicle rear side.

Namely, configuration may be made with attachment to part (a specific location) of the inside wall 12B of the front side member 12 facing the vehicle rear side of the side portion 22B (side portion 22C) of the power unit 22 along the vehicle width direction. Namely, it is sufficient that the spacer 24 be interposed between the inside wall 12B of the front side member 12 and the vehicle rear side of the side portion 22B (side portion 22C) of the power unit 22.

Explanation follows regarding operation of a vehicle front section structure 10 configured as described above.

As illustrated in FIG. 2 and FIG. 3, when for example a small overlap collision occurs at the vehicle width direction outside of the vehicle left side front side member 12, namely in which a left end portion 20A of the front bumper reinforcement 20 collides with a barrier W, the projection member 30 projecting from the outside wall 12A of the left side front side member 12 then collides with the barrier W accompanying forward progress of the vehicle.

Note that the rear end portion of the projection member 30 (at least the flange 34B) is positioned further to the vehicle rear side than the vehicle front side end portion 22A of the power unit 22. Moreover, as illustrated in FIG. 4, the projection member 30 is configured by the resin projection member body 32 covered by the metal cover body 34.

Namely, the projection member 30 is configured to suppress localized crushing, suppressing a drop in load transmission efficiency by the projection member 30. Accordingly, when the projection member 30 collides with the barrier W, a portion of the collision load is efficiently transmitted from the projection member 30, through the front side member 12, to the power unit 22 (indicated by arrow F1 in FIG. 3).

Moreover, the projection member 30 is formed in a substantially triangular shape having an apex on the vehicle width direction outside in plan view. Namely, the projection member 30 includes an oblique face at an angle with respect to the vehicle width direction in plan view. A vehicle width direction component force (toward the right side in this case) is thereby efficiently obtained by the oblique face when the projection member 30 collides with the barrier W. This enables efficient generation of lateral force with respect to the vehicle (force toward the opposite side to the collision side in the vehicle width direction).

As illustrated in FIG. 6, the spacer 24 is interposed between the inside wall 12B of the right side front side member 12, this being on the collision-opposite side in this example, and the vehicle rear side of the right side portion 22B of the power unit 22. A portion of the collision load transmitted to the power unit 22 is accordingly efficiently transmitted through the spacer 24 to the right side front side member 12 (indicated by arrow F2 in FIG. 6).

Namely, the spacer 24 can facilitate transmission of the lateral force generated in a small overlap collision to the collision-opposite side (the right side in this case), enabling even more efficient generation of lateral force with respect to the vehicle. In the event of a small overlap collision, the vehicle compartment (occupant space) can be diverted away from the barrier W, enabling deformation of the vehicle compartment (occupant space) to be suppressed or prevented.

As illustrated in FIG. 5, forming the substantially hemispherical shaped recess 33 at a substantially central portion of the projection member body 32 enables the space S to be formed between the projection member body 32 and the outside wall 12A of the front side member 12. This enables obstruction of axial compression deformation of the front side member 12 to be suppressed in a full overlap collision or a small overlap collision, thereby enabling a reduction in the energy absorption efficiency of the front side member 12 due to axial compression deformation to be suppressed.

Note that securing a wide separation between the coupling plate 14 and the front end portion of the projection member 30 (at least the flange 34A) enables obstruction of axial compression deformation of the front side member 12 to be further suppressed in a full overlap collision or a small overlap collision. Namely, such a configuration enables even a reduction in the energy absorption efficiency of the front side member 12 due to axial compression deformation to be suppressed further.

The front end portion of the projection member 30 (at least the flange 34A) is positioned further to the vehicle rear side than the crash box 18, and so in a full overlap collision or a small overlap collision, the projection member 30 does not impede energy absorption by the crash box 18. Namely, a portion of the collision load input during a full overlap collision or a small overlap collision can be absorbed by the crash box 18.

Explanation follows regarding modified examples of the vehicle front section structure 10 according to the present exemplary embodiment.

Figure 7:
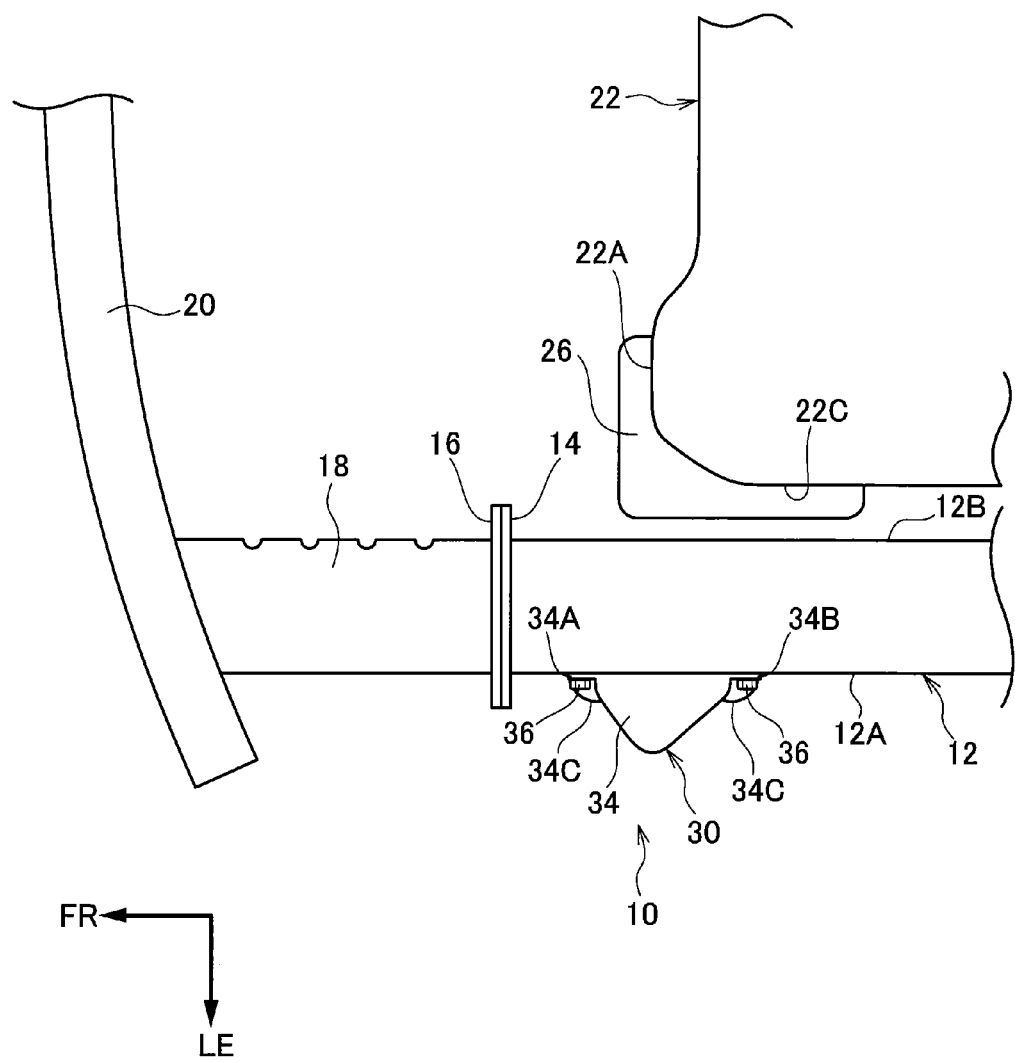
FIG. 7 is a plan view illustrating a vehicle front section structure according to the present exemplary embodiment, provided with a spacer at a left side portion of a power unit at the vehicle front side.

As illustrated in FIG. 7, configuration may be made in which a spacer 26 is provided at the vehicle front side of the left side portion 22C (and likewise the right side portion 22B) of the power unit 22. The spacer 26, similarly to the spacer 24, is formed from a resin or metal with a size leaving a gap in the vehicle width direction to the inside wall 12B of the front side member 12. The gap is set such that the inside wall 12B can contact the spacer 26 in the event of a small overlap collision.

The spacer 26 illustrated is provided straddling the power unit 22 around from the left side portion 22C to the vehicle front side end portion 22A; however it is sufficient for the spacer 26 to be provided at least at the vehicle front side (a side portion at the vehicle front side) of the side portion 22C (side portion 22B). Similarly to the spacer 24, the spacer 26 may be provided at part (a specific location) of the inside wall 12B of the front side member 12 that faces the vehicle front side of the side portion 22C (side portion 22B) of the power unit 22 in the vehicle width direction.

By disposing such a spacer 26 interposed between the inside wall 12B of the front side member 12 and the vehicle front side of the side portion 22C (side portion 22B) of the power unit 22, when the projection member 30 collides with the barrier W, a portion of the collision load is transmitted from the projection member 30, through the front side member 12 and the spacer 26, to the power unit 22. Namely, this thereby enables more efficient transmission of a portion of the collision load to the power unit 22, thereby enabling an increase in the lateral force generated with respect to the vehicle in a small overlap collision.

Figure 8:
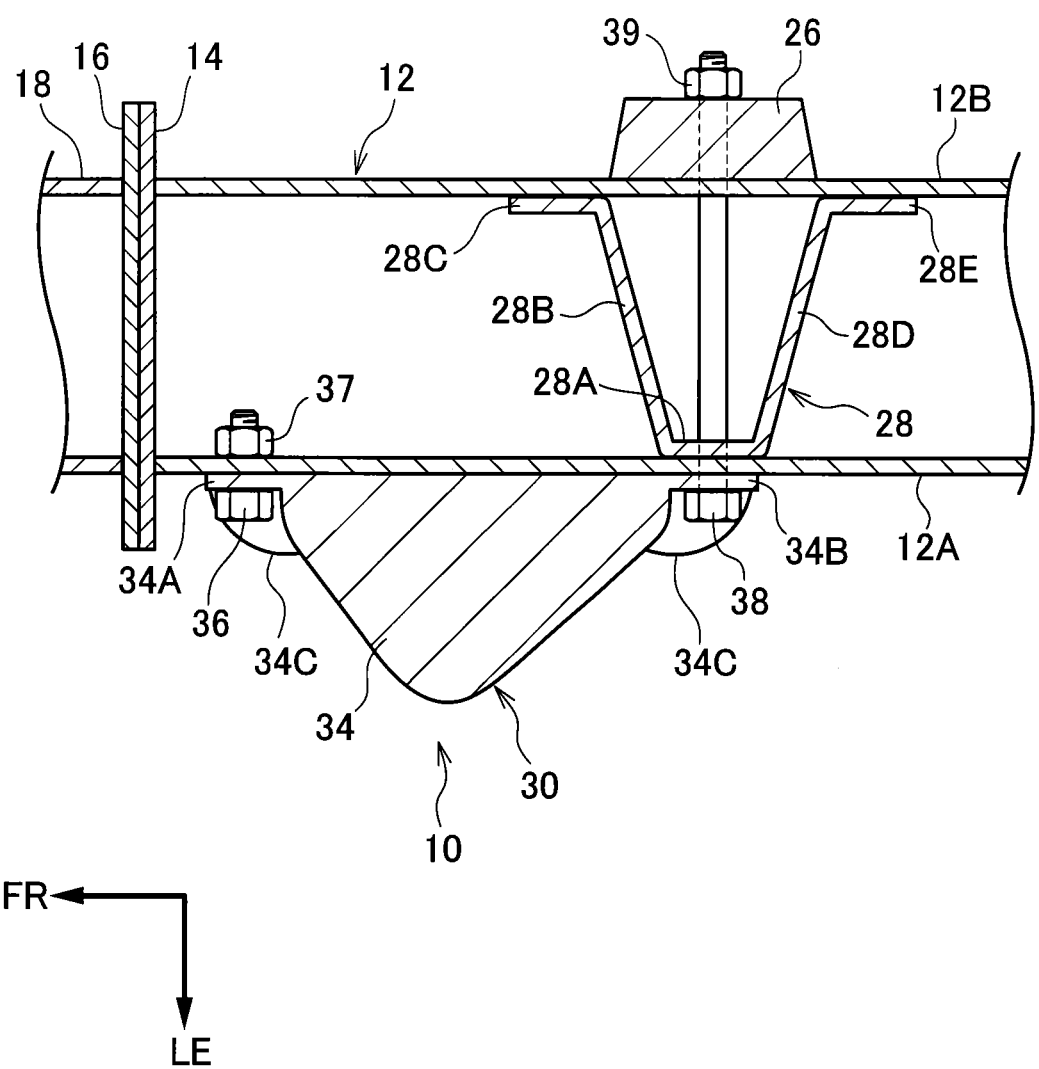
FIG. 8 is an enlarged plan view cross-section illustrating a vehicle front section structure according to the present exemplary embodiment, provided with a bulkhead inside a front side member.

As illustrated in FIG. 8, a bulkhead 28 may be provided inside the front side member 12. The bulkhead 28 is formed with a substantially hat shape open toward the vehicle width direction inside in plan view. The bulkhead 28 includes a middle plate 28A joined to the inner face of the outside wall 12A of the front side member 12 by spot welding.

The bulkhead 28 also includes a front plate 28B extending from a front end portion of the middle plate 28A toward the vehicle width direction inside, and a flange 28C extending from a vehicle width direction inside end of the front plate 28B toward the vehicle front side. The bulkhead 28 further includes a rear plate 28D extending from a rear end of the middle plate 28A toward the vehicle width direction inside, and a flange 28E extending from a vehicle width direction inside end of the rear plate 28D toward the vehicle rear side.

The flange 28C of the front plate 28B and the flange 28E of the rear plate 28D are respectively joined to the inner face of the inside wall 12B of the front side member 12 by spot welding. Namely, the bulkhead 28 couples together the outside wall 12A and the inside wall 12B inside the front side member 12.

The middle plate 28A is not limited to being joined to the outside wall 12A by spot welding, and likewise, the flanges 28C, 28E are also not limited to being joined to the inside wall 12B by spot welding. In plan view, the flange 28C and front plate 28B of the bulkhead 28 are provided at positions overlapping with the projection member 30 in the vehicle front-rear direction.

By providing the bulkhead 28 at such a position, when the projection member 30 collides with the barrier W, a portion of the collision load is transmitted from the projection member 30, through the bulkhead 28 (the front side member 12), to the power unit 22. Namely, this enables a portion of the collision load to be more efficiently transmitted to the power unit 22, and enables an increase in the lateral force generated with respect to the vehicle in a small overlap collision.

Note that configuration may be made in which the spacer 26 and the bulkhead 28 are both provided. In cases in which the spacer 26 is provided at the inside wall 12B of the front side member 12, then, as illustrated in FIG. 8, the flange 34B, the bulkhead 28 (middle plate 28A), and the spacer 26 may be disposed along a straight line in the vehicle width direction in plan view, and the flange 34B and the spacer 26 may be jointly fastened by bolts 38 and nuts 39.

Namely, in such a configuration, through holes (not illustrated in the drawings) for insertion of the bolts 38 may be formed in the middle plate 28A, and through holes (not illustrated in the drawings) for insertion of the bolts 38 may also be formed in the inside wall 12B and the spacer 26. Moreover, in such a configuration, there is no need to substitute all of the bolts 36 on the flange 34B side, illustrated in FIG. 1, for the bolts 38, and, for example, the upper and lower end bolts 36 and weld nuts 37 may be substituted for the bolts 38 and the nuts 39.

As illustrated in FIG. 9A, the projection length of the projection member 30 toward the vehicle width direction outside may be set longer than shown in FIG. 2, and in plan view, a vehicle width direction outside end of the projection member 30 may overlap with the vehicle width direction inside end of a front wheel 40 in the vehicle width direction (in FIG. 9A, the overlapping region is indicated by H).

As illustrated in FIG. 9B, in a small overlap collision between the vehicle and the barrier W, when the projection member 30 collides with the barrier W, the projection member 30 is accordingly pushed relatively toward the vehicle rear side (indicated by arrow G) by the barrier W. When this occurs, the projection member 30 impinges on the vehicle width direction inside end of the front wheel 40 (pressing the vehicle width direction inside end toward the vehicle rear inside), and rotating the front wheel 40 in the direction of arrow T shown in the drawing (causing toe-in).

Namely, the front wheel 40 can escape in a direction away from a rocker (not illustrated in the drawings) disposed at the vehicle rear side of the front wheel 40, enabling the front wheel 40 to be suppressed or prevented from impinging on the rocker. Deformation of the vehicle compartment (occupant space) due to the front wheel 40 impinging on the rocker can accordingly be suppressed or prevented.

Explanation has been given regarding the vehicle front section structure 10 according to the present exemplary embodiment based on the drawings. However, the vehicle front section structure 10 according to the present exemplary embodiment is not limited to the illustrations, and appropriate design modifications are possible within a range not departing from the spirit of the present invention. For example, as illustrated in FIG. 4, there is no requirement to form the space S between the resin member (projection member body 32) and the outside wall 12A of the front side member 12.

In the vehicle front section structure 10 according to the present exemplary embodiment, providing the space S suppresses obstruction of axial compression deformation of the front side member 12, however another configuration may be adopted provided that such operation and advantageous effects are exhibited. Moreover, explanation has been given in which the vehicle front section structure 10 according to the present exemplary embodiment has left-right symmetry; however left-right symmetry is not a requirement.

The desired operation and advantageous effects can be obtained as long as the projection member 30 is provided at the outside wall 12A of the front side member 12 so as to project toward the vehicle width direction outside, and the rear end portion of the projection member 30 (at least the flange 34B) is disposed further toward the vehicle rear side than the vehicle front side end portion 22A of the power unit 22. The spacers 24, 26 and the bulkhead 28 etc. need not be provided.

The spacer 24 and/or the spacer 26 may be provided alone, without providing the projection member 30. Moreover, there is no limitation to configuring the projection member 30 from a resin member (the projection member body 32) and a metal member (the cover body 34), and likewise, its shape is not limited to being a triangular shape in plan view, as illustrated in the drawings.

The entire contents of the disclosure of Japanese Patent Application No. 2012-203000 are incorporated by reference in the present specification. All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A vehicle front section structure comprising:
   a front side member disposed running along a vehicle front-rear direction at a vehicle width direction outside of a vehicle front section; and
   a projection member provided at an outside wall of the front side member so as to project out further to the vehicle width direction outside than the outside wall, a rear end portion of the projection member being positioned further to a vehicle rear side than a vehicle front side end portion of a power unit disposed at a vehicle width direction inside of the front side member in plan view, the projection member including:
   a front-face portion including an inclined face that is rearwardly inclined on the vehicle width direction outside in plan view; and
   a flat plate shaped rib provided at a fixed portion that fixes the projection member to the front side member.

2. The vehicle front section structure of claim 1, wherein a front end portion of the projection member is positioned further to the vehicle rear side than a crash box provided at a front end portion of the front side member.

3. The vehicle front section structure of claim 1, wherein the projection member includes a resin member and a metal member covering the resin member.

4. The vehicle front section structure of claim 3, wherein a space is formed between the resin member and the front side member.

5. The vehicle front section structure of claim 1, further comprising a load transmission member provided at a side portion of the power unit at the vehicle rear side.

6. The vehicle front section structure of claim 1, wherein the projection member is formed in a substantially triangular shape with an apex on the vehicle width direction outside in plan view.

7. The vehicle front section structure of claim 1, further comprising a load transmission member provided at an inside wall of the front side member facing the side portion in a vehicle width direction.

* * * * *